UNITED STATES PATENT OFFICE.

BENJAMIN T. BROOKS, OF PITTSBURGH, PENNSYLVANIA, ASSIGNOR TO GULF REFINING COMPANY, OF PITTSBURGH, PENNSYLVANIA, A CORPORATION OF TEXAS.

STABLE ROSIN AND PROCESS OF MAKING THE SAME.

1,167,264.  Specification of Letters Patent.  Patented Jan. 4, 1916.

No Drawing.   Application filed December 2, 1914.   Serial No. 875,186.

*To all whom it may concern:*

Be it known that I, BENJAMIN T. BROOKS, a citizen of the United States, residing at Pittsburgh, in the county of Allegheny and State of Pennsylvania, have invented certain new and useful Improvements in Stable Rosin and Processes of Making the Same, of which the following is a specification.

This invention relates to processes of manufacturing hygrogenated rosin and products of same; and it comprises as a new composition of matter an improved and stable rosin, or colophony, having many of the properties of common rosin such as solubility in varnish solvents and saponifiability or soap making properties but distinguished therefrom by possessing a substantial stability and lessened oxidizability as evinced by giving upon analytical test a lessened absorption of iodin or bromin and further distinguished by forming varnishes which do not crack and fissure upon standing and furnishing soaps or soap compositions, sizes, etc. which do not yellow with age; and it also comprises as a new composition of matter a coating material containing such a non-oxidizing or stable rosin and a varnish or paint vehicle; and it also comprises a method of producing stable rosin of the described type wherein ordinary rosin or colophony, or an analogous resin, such as Pontianak resin, guayule resin or other rubber resin, is reduced to a fluent condition by the aid of heat or a solvent, or both, and is thereafter treated by hydrogen in the presence of a hydrogen-transferring catalyst of the nature of nickel, palladium, cobalt, etc. until the material upon test shows a reduced iodin or bromin absorption; all as more fully hereinafter set forth and as claimed.

Ordinary rosin or colophony although often used in the manufacture of cheap low grade varnishes, enamels and the like, gives varnishes which in time crack and fissure or "craze." Rosin makes an unusually lustrous varnish film and if it were not for this lack of permanence it would be a highly desirable varnish resin. In other uses, rosin displays the same tendency to alternation and deterioration with time. Rosin soaps are not permanent but become yellower and harder on keeping. In one of the most extensive uses, sizing paper, the same tendency obtains. This lack of permanence I have found, is largely due to the fact that rosin is an unsaturated body and therefore tends to oxidize when exposed to air in the way in which it is exposed in a varnish film, in a body of soap or as the sizing in paper. Chemically speaking, an unsaturated body is one which does not contain the full amount of hydrogen with which it can combine. Unsaturated bodies are usually easily oxidizable. In the case of rosin size in paper the oxidation not only affects the size itself but the paper as well; probably because of the development of peroxids, formic acid, etc. Rosin sized paper, particularly if exposed to light and air, in time becomes friable and yellow. I have found that if 1 obviate or diminish these unsaturated properties of rosin by combining or saturating the rosin with hydrogen, I obtain a material which displays all the valuable properties of rosin as regards the making of high luster varnish films and the preparation of soap while it no longer has the undesirable property of lack of permanence or stability when exposed to the air. The improved or stabilized rosin or colophony made under the present invention when converted into varnishes gives high grade varnish in lieu of the ordinary low grade article; a varnish film which is permanent in air, and at the same time of extremely attractive appearance. It is also adapted to make a better grade of soap and a higher class, more permanent paper size.

Rosin consist largely of sylvic or abietic acid (abietic anhydrid). Abietic acid, or the rosin, appears to hydrogenate in stages, there being a first absorption of hydrogen which is more energetic than the later absorption. This first, easily hydrogenating stage corresponds to the highest oxidizability and if the hydrogenation be carried only to the end of this first stage the rosin loses most of its alterability in air.

While the addition of hydrogen to the rosin or its saturation therewith may be performed in many ways a simple method of procedure is to reduce the rosin to a fluid state by heat, stir in 3 per cent. of freshly reduced nickel and thereafter expose the mixture to an atmosphere or current of hydrogen. Any suitable stirring or agitating means may be used to produce intimate contact of the mixture of rosin and catalyst with the hydrogen gas. A temperature of 180° to 230° C. is suitable for this operation. The progress of the reaction may be followed by watching the gage pressure where the operation is performed under pressure. When the pressure, as indicated by the gage, ceases to diminish with comparative rapidity, that is the rapidity of absorption of hydrogen slackens, the first stage of saturation is over. After this time there will be a slower diminution of pressure. Or the progress of the action may be followed by testing samples from time to time with an iodin solution or a bromin solution. As the hydrogen is absorbed the amount of iodin or bromin which can be taken up by the rosin in a test steadily and concomitantly diminishes. The treatment may be carried to a point where the iodin absorption shows no further substantial reduction on continuation of the treatment or to the point where the iodin number disappears altogether. Any degree of saturation by hydrogen of the unsaturated constituents of the rosin is useful for the present purposes, but I usually carry on the treatment till at least the first stage of rapid absorption is over and I may advantageously carry it on till unsaturation (as shown by iodin or bromin) substantially disappears.

Any convenient form of apparatus suitable for hydrogenation may be used. Instead of using nickel, cobalt, copper or iron may be employed, but these other metals are not quite as effective as the nickel. Whichever metal is used it is best reduced from an oxid formed from its nitrate, reduction being by a current of hydrogen at a low temperature; a temperature not markedly in excess of 300° C. and advantageously lower. Instead of using the described metals, their oxids may be employed but in this event it is desirable to perform the treatment with hydrogen at a somewhat higher temperature, say about 240° C.

The catalyst may be used with any of the usual carrier, such as kieselguhr, alumina, coke, asbestos, etc., to increase the surface and diminish the density.

Impregnation with hydrogen may usually be accomplished in about three hours at 200° C., using freshly reduced nickel.

If desired instead of simply melting the rosin by the aid of heat a solvent may be used as a vehicle for the rosin and catalyst; such as alcohol or a good grade of kerosene, substantially free from unsaturated bodies. Hydrogenation may be under pressure if desired.

Instead of using the stated metals, or their oxids, colloidal palladium, (or palladium chlorid) or other platinum group metal, may be used. Palladium in the colloidal or spongy condition is an advantageous catalyst for the present purposes. In using colloidal palladium hydrogenation may be performed at the ordinary temperature or slightly above, the rosin in this case being maintained in a fluent condition by the use of an appropriate solvent, such as alcohol, benzol, gasolene, toluene, etc. Spirits of turpentine is not so suitable since the turpentine in the present process itself takes up hydrogen and changes its properties. Colloidal palladium may be directly formed in or added to the rosin solution or it may be produced in an oily carrier and then added to the solution of rosin. Or a water solution of colloidal palladium may be agitated with a solution of rosin in a suitable solvent in the presence of hydrogen until the desired degree of saturation is effected.

After treatment in any of the described ways, the rosin or rosin solution may be separated from the catalyst by filtration and the catalyst can then be reused. Where the rosin is used in connection with a volatile solvent, such as alcohol, kerosene, benzol, toluene, alcohol, etc., after separation of the catalyst from the hydrogenated mixture the volatile solvent may be simply distilled off leaving the improved new or stabilized rosin as a residue.

The improved rosin may be converted into rosin soap in any of the well known ways. Its saponifying properties are not in any way interfered with by the described hydrogenation process, provided such process be not carried on beyond the point at which the iodin absorption ceases to diminish substantially. It is also an improved sizing material. It is however particularly well adapted for making varnishes. For this purpose it may be dissolved in one of the usual varnish or paint vehicles, such as linseed oil, soy oil, tung oil, alcohol, benzol, etc. Pigments may be admixed if desired. The varnish produced from a solution of the improved rosin in linseed oil on drying gives varnish films which are durable, lustrous, and free from the tendency to crack or fissure evinced by ordinary rosin varnishes.

Similar results to those given by colophony may be obtained upon hydrogenation of very many other resins known as varnish "gums" and in use for making varnish. The hydrogen treatment much improves their stability and quality. Among these resins which may be so improved are Pontianak resin, guayule resin, etc.

The hydrogen employed may be from any of the usual sources but is best a high grade relatively pure hydrogen. Water gas is less suitable. When using iodin to control the reaction, a convenient form of test is the Hanus method of determining the iodin number. Ordinarily I carry on hydrogenation till the resultant product does not show an iodin value over about 20 by the Hanus method.

What I claim is: —

1. As a new composition of matter, a material comprising a resin having the saponification value and many of the other properties of colophony but distinguished therefrom by having an iodin absorption not above 20, such resin being permanent in the air and evincing little or no tendency to take up oxygen even when existing in thin films.

2. A coating material comprising a hydrogenated resin having the saponification value and many of the other properties of colophony but distinguished therefrom by having an iodin absorption not exceeding 20 and by the power of forming permanently continuous films without development of fissures or crazing.

3. As a new composition of matter a resin of the colophony class displaying a high saponification value and having an iodin absorption of less than 20.

4. The process of improving resins which comprises reducing a resin of the colophony class to a fluent condition and treating with hydrogen in the presence of a hydrogen-transferring catalyst.

5. The process of improving colophony which comprises reducing colophony to a fluent condition and treating with hydrogen in the presence of a hydrogen-transferring catalyst.

6. The process of improving resin which comprises reducing a resin of the colophony class to a fluid state by heat, admixing a hydrogen-transferring catalyst and treating with hydrogen until the iodin absorption ceases to diminish.

7. The process of improving colophony which comprises reducing it to a fluid state by heat, admixing a hydrogen-transferring catalyst and treating with hydrogen until the iodin absorption ceases to diminish.

In testimony whereof, I affix my signature in the presence of two subscribing witnesses.

BENJAMIN T. BROOKS.

Witnesses:
S. C. PERRING,
GEO. B. NICKEL.